(No Model.)

H. R. ENGLISH.
HITCHING DEVICE.

No. 347,585. Patented Aug. 17, 1886.

WITNESSES
G. S. Elliott.
E. W. Johnson.

Henry R. English.
INVENTOR

Attorney

UNITED STATES PATENT OFFICE.

HENRY R. ENGLISH, OF JACKSON, MISSOURI.

HITCHING DEVICE.

SPECIFICATION forming part of Letters Patent No. 347,585, dated August 17, 1886.

Application filed May 20, 1886. Serial No. 202,769. (No model.)

*To all whom it may concern:*

Be it known that I, HENRY R. ENGLISH, a citizen of the United States of America, residing at Jackson, in the county of Cape Girardeau and State of Missouri, have invented certain new and useful Improvements in Hitching Devices; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in portable hitching devices.

The object of my invention is to provide a portable means, or one which can be readily attached to an object so as to form a means for hitching or tying a horse thereto; and to this end my invention consists in an implement which is provided with a handle, one end of which is slotted, said handle having projecting therefrom a shank with a gimlet-point, the upper end of said shank being screw-threaded, so as to retain thereon a cover-socket.

Figure 1:
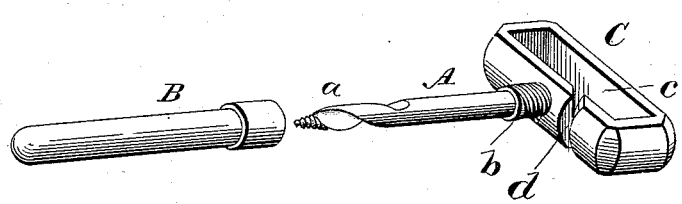
Figure 2:
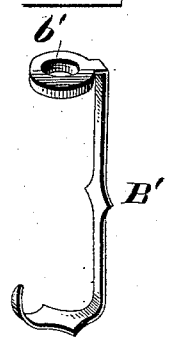

In the accompanying drawings, which illustrate my invention, Figure 1 is a perspective view of a hitching device constructed in accordance with my improvements, and Fig. 2 is a detail perspective view of a covering-plate which may be applied in lieu of the socket shown in Fig. 1.

A refers to the shank, the end of which is provided with a gimlet-point, $a$, while the other end is enlarged, said circular enlarged portion being provided with threads $b$, which will engage with the female threads formed upon the interior of the covering-socket B. The handle C is provided on its interior with a rectangular opening, $c$, and also with an opening or slot, $d$, with inclined edges. The exterior of the handle C is rounded, so that it will not have sharp edges, which will be liable to wear the pocket of the person carrying the same.

When it is desired to secure a horse by means of this implement, the socket B is removed from the shank, and by turning the handle the shank can be secured into a tree or other object. The hitching-strap is then inserted through the slot D, so that it will lie within the rectangular opening $c$. It will be noticed that the edges of the slot are beveled toward the larger portion of the opening, so that the strap can be readily inserted therein edgewise.

Instead of employing the socket B, I may use a covering-piece, B', as shown in Fig. 2, the upper portion thereof being bent at right-angles to the body portion and screw threaded, as shown at $b'$, the lower end thereof being bent so as to cover the gimlet-point.

The device hereinbefore described is extremely simple and can be manufactured at a small cost.

I claim—

A hitching device consisting of a gimlet-pointed shank having an enlarged screw-threaded portion adjacent to the handle, a handle, C, with a central opening, and a slot with beveled edges located to one side of the center thereof, and detachable means for covering the shank, the parts being combined, substantially as shown and for the purpose set forth.

In testimony whereof I affix my signature in presence of two witnesses.

HENRY R. ENGLISH.

Witnesses:
 HUGH R. QUINN,
 FRED. GOYERT.